United States Patent
Jagadeesan et al.

(10) Patent No.: US 7,433,701 B1
(45) Date of Patent: Oct. 7, 2008

(54) SMART FRAME SELECTION FOR IMPROVED BACKHAUL BANDWIDTH EFFICIENCY

(75) Inventors: Ramanathan Jagadeesan, San Jose, CA (US); Bich Nguyen, Los Altos, CA (US); Kent G. Iverson, Hermosa Beach, CA (US)

(73) Assignee: Cisco Technology, Inc., San Jose, CA (US)

(*) Notice: Subject to any disclaimer, the term of this patent is extended or adjusted under 35 U.S.C. 154(b) by 1072 days.

(21) Appl. No.: 10/313,758

(22) Filed: Dec. 5, 2002

(51) Int. Cl.
*H04B 7/00* (2006.01)

(52) U.S. Cl. .............. 455/517; 455/507; 455/436; 455/452.2; 370/310; 370/315

(58) Field of Classification Search .......... 370/310, 370/315, 328, 331–333; 455/517, 507, 436, 455/438, 11.1, 452.2
See application file for complete search history.

(56) References Cited

U.S. PATENT DOCUMENTS

| | | | |
|---|---|---|---|
| 5,613,203 A * | 3/1997 | Dupuy et al. | 455/436 |
| 5,940,381 A * | 8/1999 | Freeburg et al. | 370/331 |
| 6,330,449 B1 * | 12/2001 | Kim | 455/442 |
| 6,501,741 B1 * | 12/2002 | Mikkonen et al. | 370/310 |
| 6,507,744 B1 * | 1/2003 | Han et al. | 455/522 |
| 6,728,217 B1 * | 4/2004 | Amirijoo et al. | 370/252 |
| 6,901,058 B2 * | 5/2005 | Lalwaney | 370/320 |
| 6,959,199 B2 * | 10/2005 | Ohkubo et al. | 455/522 |
| 6,982,957 B2 * | 1/2006 | Kiiski et al. | 370/235 |
| 7,079,852 B1 * | 7/2006 | Budnik | 455/452.2 |
| 7,359,710 B2 * | 4/2008 | Benco et al. | 455/452.2 |
| 2001/0053138 A1 * | 12/2001 | Pillai et al. | 370/331 |
| 2002/0058493 A1 * | 5/2002 | Ikeda et al. | 455/403 |
| 2005/0260990 A1 * | 11/2005 | Huang et al. | 455/436 |

OTHER PUBLICATIONS

Rahnema, Moe, Overview of the GSM System and Protocol Architecture, IEEE Communications Magazine, Apr. 1993, pp. 1-9.

* cited by examiner

*Primary Examiner*—Lana N Le
(74) *Attorney, Agent, or Firm*—Stolowitz Ford Cowger

(57) ABSTRACT

A wireless cellular network includes an access point selector that selects an access point for forwarding data from a wireless device. When data is received with an unacceptable quality level, the access point selector queries other access points for the same data. The queried access points send data quality information to the access point selector. The access point selector uses the data quality information for selecting another one of the access points to forward data from the wireless device.

17 Claims, 8 Drawing Sheets

BACKGROUND

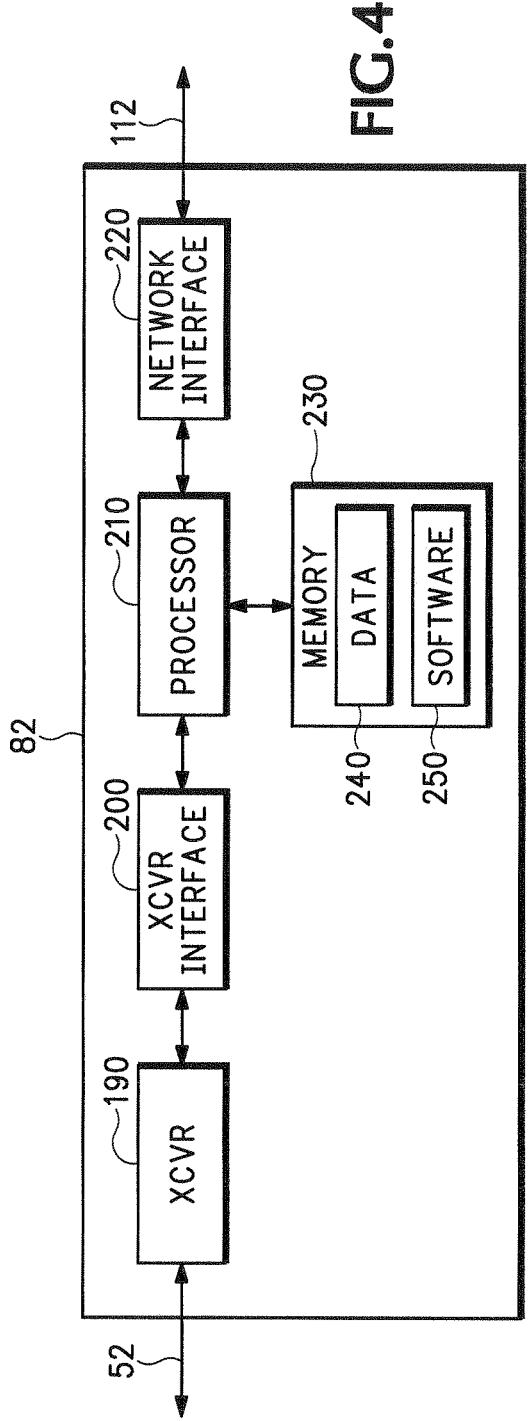
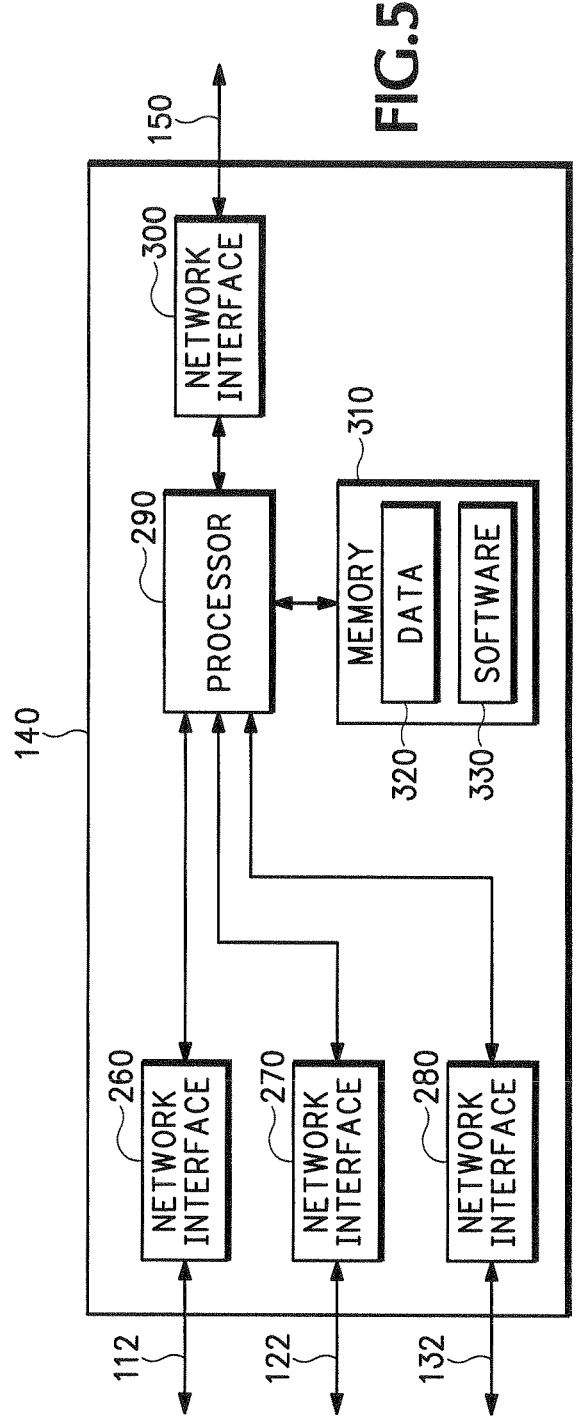

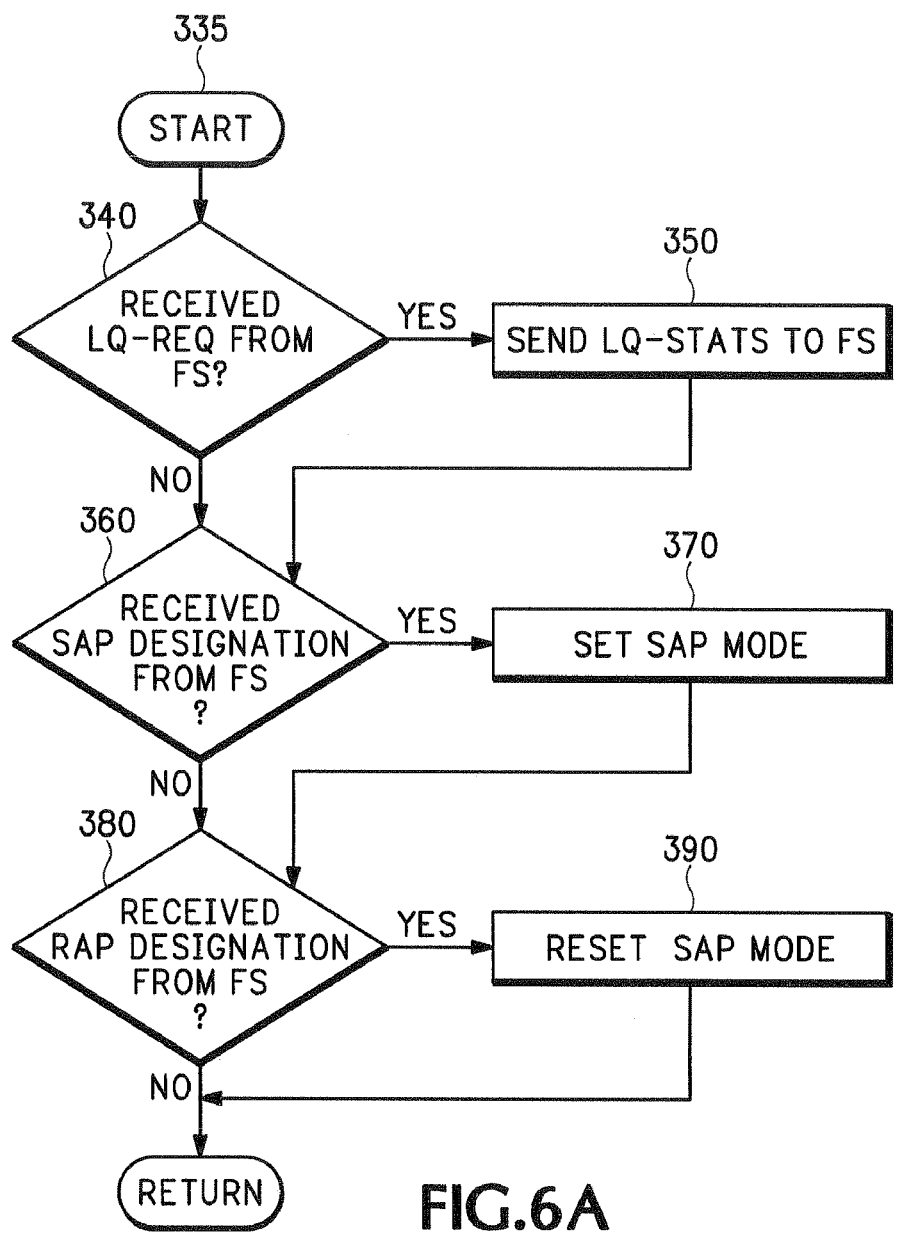

SMART FRAME SELECTION FOR IMPROVED BACKHAUL BANDWIDTH EFFICIENCY

FIELD OF THE INVENTION

The present invention relates to a method and apparatus for uplink frame selection in a wireless cellular network, and more particularly to a technique for reducing bandwidth in cellular network uplinks.

BACKGROUND OF THE INVENTION

Wireless cellular networks enable communication among mobile devices such as cellular telephones, Voice Over Internet Protocol (VoIP) phones, wireless Personal Digital Assistants (PDAs), laptop computers, and other devices such as Personal Computers (PCs).

Communication with a wireless device is facilitated via a number of base stations or Access Points (APs) that are located in the current vicinity of the wireless device. As the location of the wireless device changes, a most-appropriate access point is chosen to handle data traffic on a forward link directed to the device and a reverse link received from the wireless device.

A hard handoff refers to a cellular network that makes the AP selection for handling the reverse link traffic in a relatively abrupt manner. A soft handoff refers to a cellular network that makes the AP selection in a relatively gradual manner. Soft handoffs can increase cell coverage and cell capacity.

In a soft handoff, M access points receive reverse link frame traffic from the wireless device and forward the frame traffic to a Selection Distribution Unit (SDU). The access points also forward frame quality indicators to the SDU, such as a Cyclic Redundancy Check (CRC), error flags, and signal strength readings. A Frame Selector (FS) in the SDU selects the best frame out of the M frames received from the M different APs for forwarding to higher levels of the network. This allows the SDU to use reverse link traffic from different APs in a non-abrupt and graceful manner.

Implementing soft handoffs require the APs to transmit multiple versions of the same frame over the backhaul (reverse link) cellular network to the FS. This unfortunately increases backhaul bandwidth and cost.

BRIEF DESCRIPTION OF THE DRAWINGS

FIG. 4 is a more detailed block diagram of circuitry used in an access point.

FIG. 5 is a more detailed block diagram of circuitry used in a frame selector.

FIGS. 6A and 6B are flowcharts showing operations performed by the access point.

DETAILED DESCRIPTION

Figure 1:
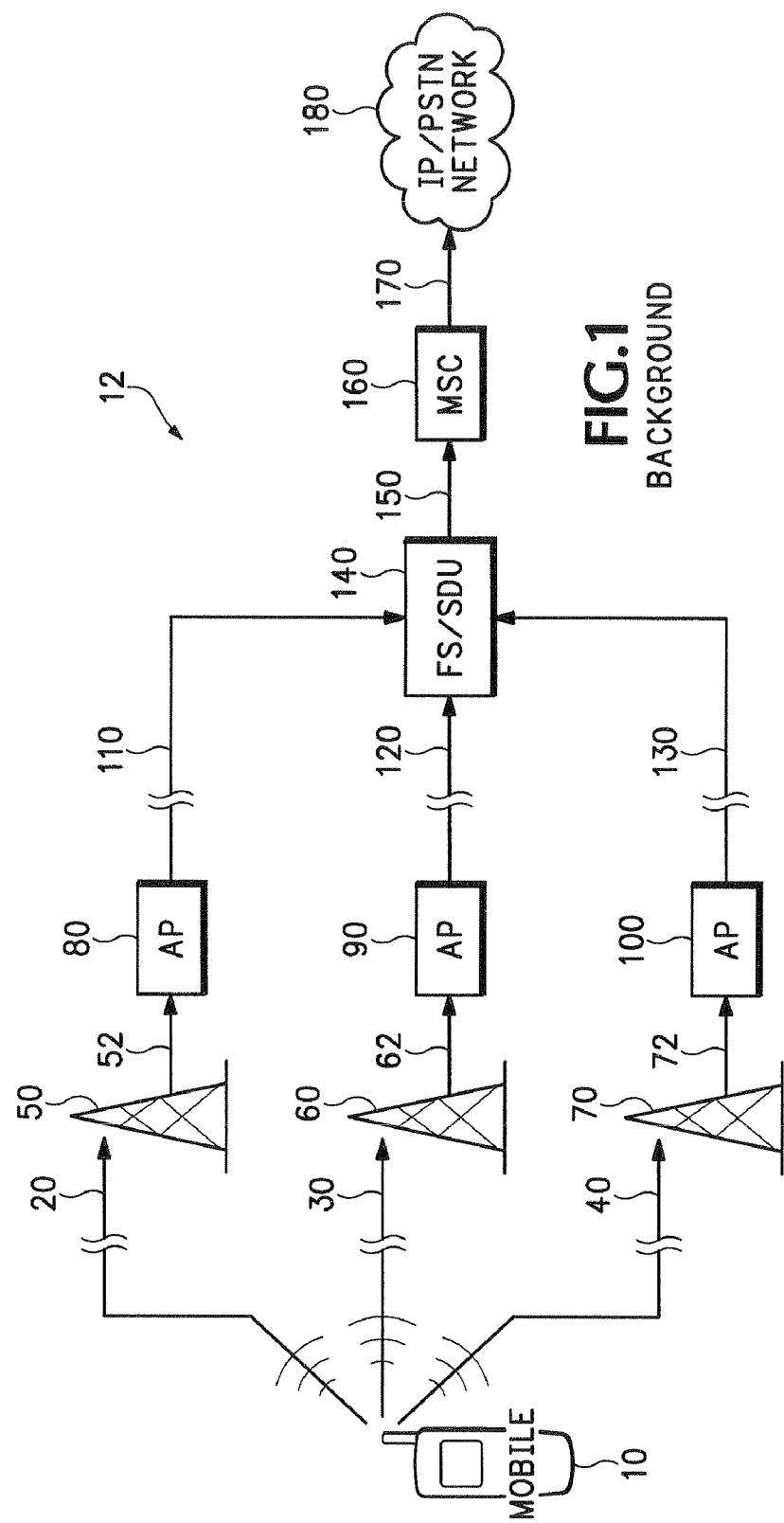
FIG. 1 is a block diagram of a network implementing a soft handoff.
Figure 2:
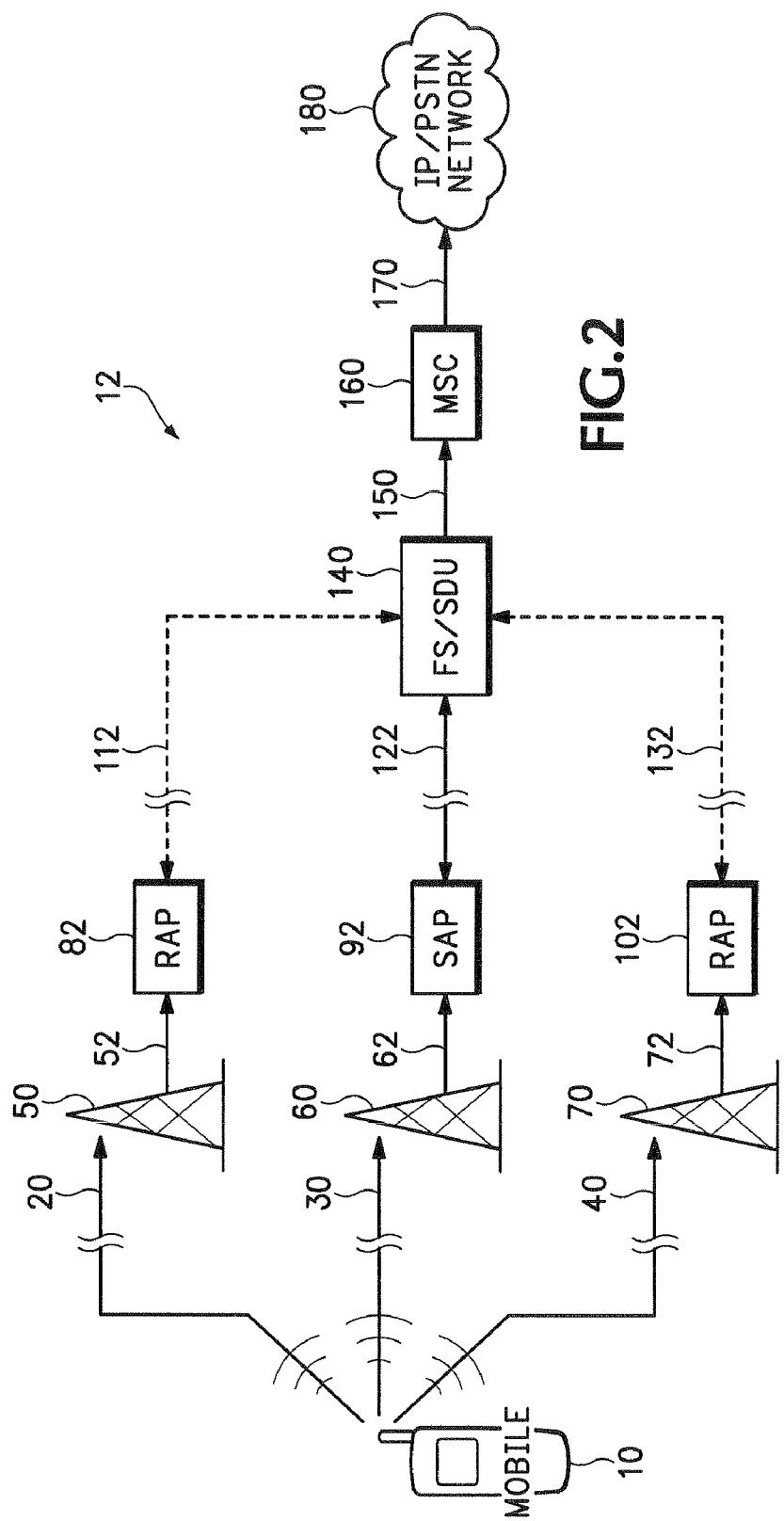
FIG. 2 is a block diagram of a network implementing an improved soft handoff.
Figure 3:
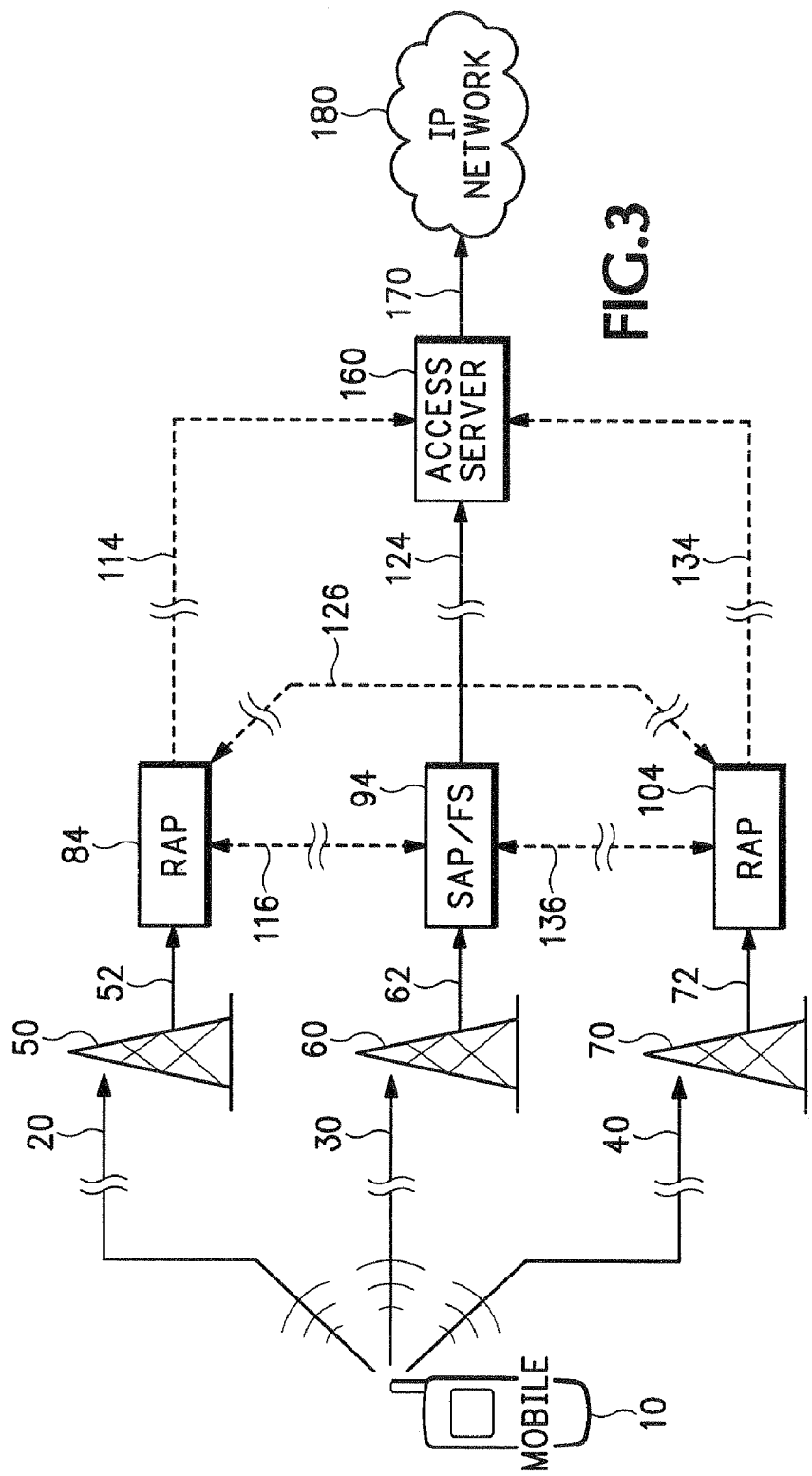
FIG. 3 is a block diagram of a network implementing soft handoff where a serving access point also performs frame selection.

FIG. 1 shows a wireless cellular network 12 that implements conventional soft handoffs. In FIGS. 1, 2 and 3, only reverse link (uplink) traffic is shown.

Mobile device 10 is shown sending data traffic via wireless channels 20, 30 and 40 to antennas 50, 60 and 70, respectively. The antennas 50, 60 and 70 are connected via local connections 52, 62 and 72 to Access Points (APs) 80, 90 and 100, respectively. Other APs may exist in the cellular network 12, but only the APs presently involved in reception of traffic from mobile device 10 are shown and may be considered the active set of APs.

For a soft-handoff, the active-set of APs 80, 90 and 100 constantly forward uplink traffic received from mobile device 10 over links 110, 120 and 130 respectively to the Frame Selector (FS) and Selection Distribution Unit (SDU) 140. The frame selector and selection distribution unit are referred to generally as the FS 140. Selected frames are forwarded via connection 150 to a Mobile Switching Center (MSC) 160, which communicates via connection 170 with an Internet Protocol (IP) network and/or Public Switched Telephone Network (PSTN) 180.

FIG. 2 illustrates an improved soft handoff where one of the active APs is designated as the Serving AP (SAP) 92. The remaining active APs are designated as Redundant APs (RAPs) 82 and 102.

The SAP 92 functions in a manner similar to one of the APs in FIG. 1 by constantly forwarding uplink traffic from mobile device 10 to FS 140 via connection 122. A solid line 122 represents forwarded uplink traffic. The FS designates the APs 82, 92 and 102 as SAPs or RAPs.

The RAPs 82 and 102 typically do not forward wireless traffic received form mobile device 10 ot FS 140. Instead, the wireless traffic, as well as associated traffic-quality indicators and associated timestamps and access handles, are stored in memory 310 (FIG. 5) located in the AP.

The frame-quality indicators, derived from the received frame traffic by the APs, include Cyclic Redundancy Check (CRC) error, Signal-to-Interference-plus-Noise Ratio (SINR) and Received Signal Strength Indicator (RSSI) information. Derivation and analysis of these frame-quality indicators are well known to those skilled in the art and are therefore not explained in further detail.

In one condition, the frames received by FS 140 from SAP 92 have an acceptable quality level based on their associated frame-quality indictors. The FS 140 then permits the frames received from SAP 92 to be forwarded to higher levels 160 and 180 of the network 12.

However, the frame-quality indicators may eventually indicate the frames received from SAP 92 are unacceptable. For example, the CRC check may have failed, or SINR or RSSI value may be below some predetermined acceptable value. The FS 140 then requests one or more of the RAPs 82 and 102 to send frames stored in memory that correspond with the unacceptable frame previously received from SAP 92. The RAPs 82 and 102 also send FS 140 the frame-quality information associated with the sent frame.

Connection 112 between RAP 82 and FS 140, as well as connection 132 between RAP 102 and FS 140, are shown as dashed lines. The dashed lines represent non-principal links to FS 140. The uplink-related communication is shown as being bi-directional in nature across the connections 112 and 132 to reflect the issuance of requests by FS 140 and the associated responses by RAPs 82 and 102.

The FS 140 requests frame information from the RAPs 82 and 102 using frame-request (FR-REQ) messages. The RAPs receive the FR-REQ message and respond back to the FS 140 with a frame-response (FR-RESP) message. In one implementation, the FR-REQ messages are addressed to individual RAPs. In another implementation, the FS 140 sends a single multicast FR-RESP message that addresses all the RAPs.

In one example, the FR-RESP messages are returned to FS 140 regardless of the quality of the frame contained in the RAP. In another example, a frame negative acknowledge (FR-NAK) message is sent by the RAP instead of an FR-RESP message when the quality of the frame stored in the RAP is below some acceptable level. This further reduces the amount of network bandwidth. In one embodiment, the SAP 92 always forwards received frame and frame-quality information to FS 140, regardless of the quality of the frame as received by the SAP 92. In another embodiment, only a FR-NAK message is sent by the SAP 92 when the quality of the frame is not acceptable.

The various frame-quality indicators mentioned above are used by the APs to determine whether wireless device data or an FR-NAK message is sent to the FS 140. In another implementation, Reverse-link Power Control (RPC) information is used to determine if frames are sent to the FS 140. In yet another implementation, link-quality statistical information (discussed below) is used to determine when frames are sent to the FS 140.

Frames can be classified as acceptable or unacceptable by RAPs 82 and 102, SAP 92 and/or FS 140 using CRC error information. Alternatively, the Signal-to-Interference-plus-Noise Ratio (SINR) or Received Signal Strength Indication (RSSI) information may be used. The SINR or RSSI can be used when the CRC is not present, when Unequal Error Detection (UED) is used, or when CRC error information is insufficient for providing acceptable or unacceptable frame classifications.

All active APs may collect statistical information concerning the link quality of connections 20, 30 and 40. The statistical information may include short-term averages of Frame Error Rate (FER), as well as SINR and RSSI indicators. This information can be sent to FS 140 in link-quality statistics (LQ-STATS) messages.

The FS 140 may explicitly request the APs to reply with LQ-STATS messages. Alternatively, the APs may periodically send LQ-STATS messages to the FS 140. In yet another implementation, the APs may send LQ-STATS messages asynchronously to the FS 140 when events happen locally at particular APs. The APs can also send link-quality information for multiple links in the same LQ-STATS message. For example, the AP may currently have wireless communication channels established for multiple mobile devices 10 at the same time. One LQ-STATS message may contain information for all the wireless communication channels.

The frame-quality and link-quality information is used by FS 140 to determine which active AP to designate as the SAP. The AP 92 in FIG. 2 is shown as the currently designated SAP. However, when a link or frame-quality situation changes, FS 140 might re-designate a more appropriate AP to perform the SAP function. For example mobile device 10 may be initially closer to AP 92, but may move closer to AP 82 or AP 102. In another situation, even though mobile device 10 may be located closer to AP 92, due to physical obstructions, either AP 82 or AP 102 may receive the higher quality signal from mobile device 10. In this situation, AP 92 may initially be designated as the SAP, then AP 82 or AP 102 may be re-designated as the SAP.

FIG. 3 shows an embodiment where the frame-selector is located in the currently-designated SAP. The FS in SAP 94 operates similarly to the FS 140 shown in FIG. 2. The topology of the uplink network shown in FIG. 3 includes connections 116 and 136 that permit SAP/FS 94 to receive frame, frame-quality and link-quality information from RAPs 84 and 104. Any active AP can be designated by SAP/FS 94 as the next SAP/FS. If another AP is designated as the next SAP/FS, current SAP/FS 94 would re-designate itself as a RAP. Network connections 116, 126 and 134 allow all APs to communicate among themselves. Connections 114, 124 and 134 carry uplink information to higher levels of the network.

Radio-Link Protocol (RLP) and Point-to-Point Protocol (PPP) terminations can be co-located on the SAP/FS 94. The FS can use RLP and PPP link error information together with the other frame-quality information discussed above. For example, RLP and PPP loss rate information can be used to determine which AP to designate as the next SAP/FS.

The examples above show a single SAP present in the network. In another embodiment, a plurality of APs may operate as SAPs. Each SAP would constantly send uplink information to the FS. The FS may be located on one of the SAPs as shown in FIG. 3 or the FS may be located on another device as shown in FIG. 2. At least one of the active APs however functions as a RAP.

FIG. 4 is a more detailed block diagram for one of the APs 82, 92 or 102. A transceiver (Xcvr) 190 receives uplink signals from antenna 50 (FIG. 2) via connection 52. A Xcvr interface 200 makes the uplink information available to processor 210. Processor 210 uses memory 230 to store frame data and frame quality information 240 and frame-processing software 250. Network interface 220 enables processor 210 to send and receive information with FS/SDU 140 via connection 112. In one example, the network interface 220 may connect to a circuit switched network, packet switched network, or both.

The data 240 includes the data or audio frames received from the mobile device 10 along with any frame-quality information associated with the frames. By saving the frames from mobile unit 10, the AP 82 can supply frames and frame-quality information in a FR-RESP when the FS sends a FR-REQ. The frames or packets can be indexed according to timestamp values.

FIG. 5 is a detailed block diagram of FS/SDU 140 shown in FIG. 2. Network interfaces 260, 270 and 280 enable processor 290 to communicate with RAP 82, SAP 92 and RAP 102 (FIG. 2) via connections 112, 122 and 132. In another embodiment, some or all communications use the same network interface. Processor 290 uses memory 310 to store data 320 and frame-processing software 330. Network interface 300 enables processor 290 to send uplink information to higher levels of the network via connection 150. Connections 112, 122, 132, and 150 can be packet switched or circuit switched links.

FIG. 6A shows the message processing activities performed by an AP. At the start (block 335) if the AP has received a request from the FS for an LQ-STATS message (block 340), the AP responds with the requested information (block 350). If the AP has received a request from the FS to function as the SAP (block 360), the AP is set to operate in the SAP mode (block 370). If the AP receives a request from the FS to function as a RAP (block 380), the AP is set to operate in the RAP mode (block 390).

Figure 6B:
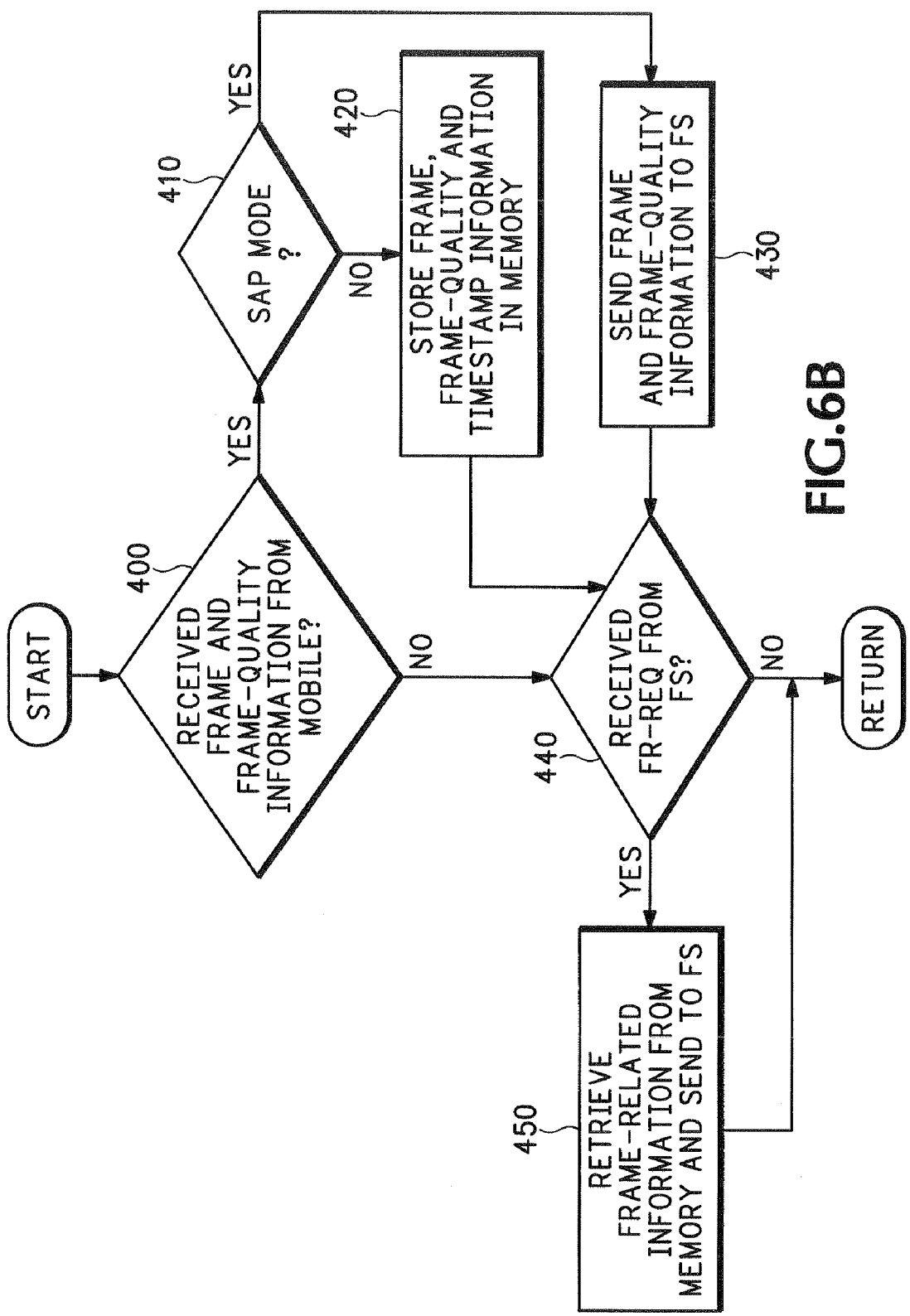

FIG. 6B shows the frame processing activities performed by the AP. If the AP has received uplink frame and frame-quality information from the mobile device (block 400), the AP checks its operational mode in block 410. If the AP is in the SAP mode, the frame and frame-quality information is sent to the FS (block 430). Otherwise the information is stored along with a time-stamp and other related information in memory (block 420). If the AP has received a FR-REQ from the FS (block 440), then the requested frame and frame-quality information is retrieved from memory and communicated to the FS (block 450). The frame requested by the FS can be identified in one example according to a time-stamp value that is sent in the FR-REQ.

Figure 7A:
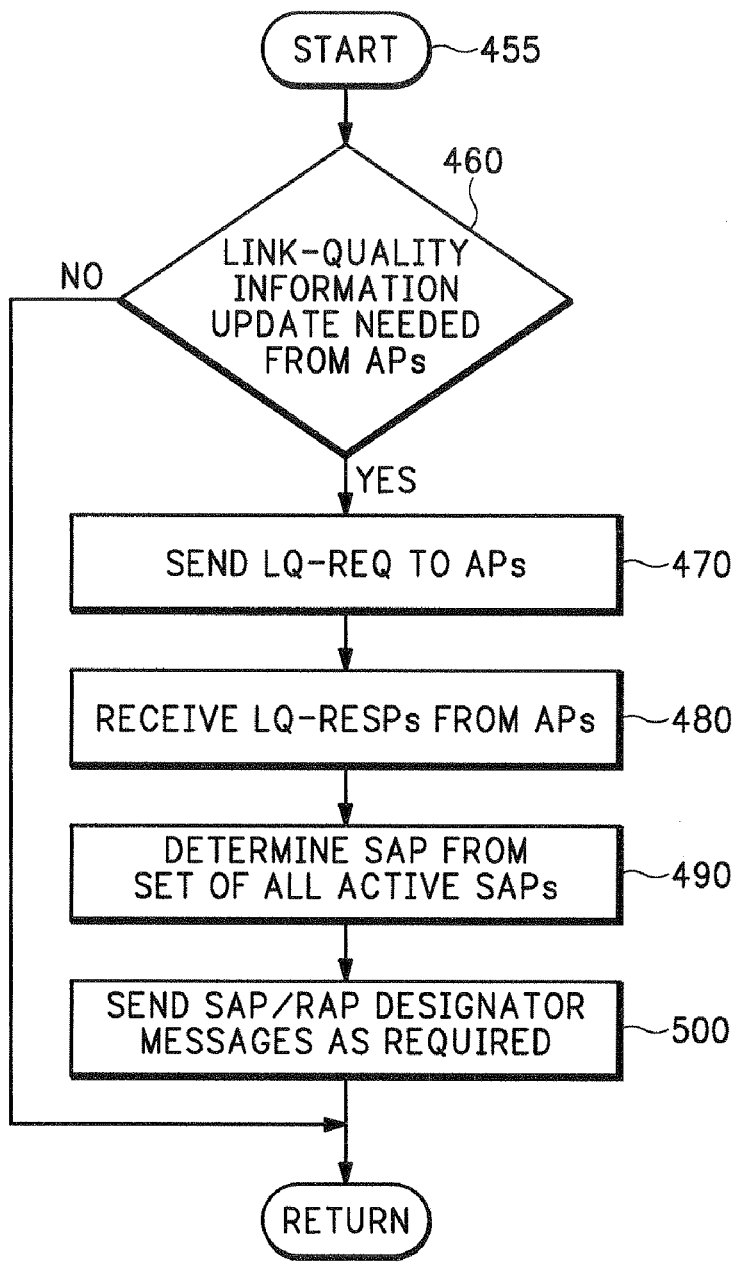
FIGS. 7A and 7B are flowcharts showing operations performed by the frame selector.

FIG. 7A shows the SAP designation activities performed by the FS. At the start (block 455) if the FS requires frame-quality information from one or more of the APs (block 460), it sends a request to the APs (block 470) and receives the requested LQ-STATS messages (block 480). The LQ-STATS information is used to determine which AP should be the SAP (block 490). Redesignation messages are sent to the APs if a different SAP is selected (block 500).

Figure 7B:
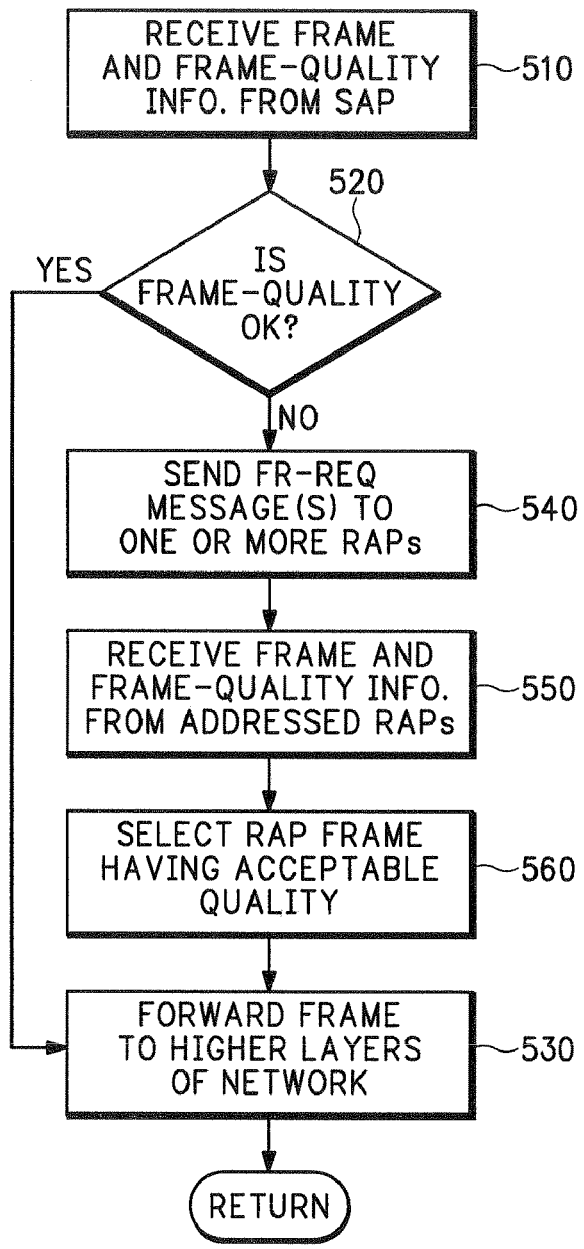

FIG. 7B shows the frame processing activities performed by the FS. The FS receives frame and frame quality information from the SAP when available (block 510), and determines whether the frame quality is acceptable (block 520). If the frame quality is acceptable, the frame is forwarded to higher levels of the network (block 530). If the frame quality is not acceptable, redundant frame and associated frame-quality information is requested from one or more of the RAPs (block 540) and received from the requested RAPs (block 550). One of the RAP frame having acceptable quality is then selected (block 560) and forwarded to higher levels of the network (block 530).

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claims are made to all modifications and variation coming within the spirit and scope of the following claims.

What is claimed is:

1. A method for handling wireless uplink traffic in an uplink network, comprising:
   receiving, at a particular one of a plurality of access points, a plurality of frames of the wireless uplink traffic from a wireless unit;
   deriving frame-quality information from the received wireless uplink traffic, wherein the received frames are associated with respective indicators of the frame-quality information;
   in response to receiving at the particular access point, a request for a particular one or more of the received frames, forwarding the particular received frames and the respective frame-quality indicators to a distribution unit; and
   wherein at least some of the received frames are audio frames.

2. A method according to claim 1 including operating in a redundant access point mode where the particular received frames are only forwarded in response to the receiving the request.

3. A method according to claim 2 including operating, subsequent to receiving at the particular access point a server access point designation message, in a server access point mode where the received frames are forwarded in response to the receiving the frames.

4. A method according to claim 1 including operating in a frame selector mode where the wireless uplink traffic from the wireless unit is selectively received via the access points and the wireless uplink traffic from the wireless unit via one of the access points is selected for forwarding to a packet or circuit switched network.

5. A method according to claim 1 including multiplexing the frame-quality information with other frame-quality information derived from the wireless uplink traffic from other wireless units and sending the multiplexed frame-quality information to the distribution unit.

6. A method according to claim 1 including sending at least some of the frame-quality information to provide a selection criteria for determining which one of the access points will operate as a server access point and which of the access points will operate as redundant access points.

7. A method according to claim 1 including sending a no-acknowledge message in response to receiving the request when the respective frame-quality indicators of the particular received frames indicate a low-quality level.

8. A method according the claim 1 including generating the frame-quality information from power control information associated with the wireless uplink traffic from the wireless unit.

9. A method according to claim 1 including generating the frame-quality information from Cyclic Redundancy Code (CRC) data or a signal-to-noise ratio for the wireless uplink traffic from the wireless unit.

10. A wireless network access point, comprising:
    a first interface for receiving uplink data over a wireless link wherein at least some of the uplink data is audio data;
    a second interface for communicating with a distribution unit in the wireless network; and
    a processor configured to derive frame-quality information from the received uplink data and associate the received uplink data with the frame-quality information, wherein in response to receiving a request for particular received frame uplink data, forwarding the requested frame uplink data and the associated frame-quality information to the distribution unit.

11. A wireless network access point according to claim 10 including a memory configured to store at least some of the uplink data received over the wireless link when operating in the redundant mode, the processor sending the stored uplink data to the distribution unit only when the request message is received.

12. A wireless network access point according to claim 11 wherein the processor rejects the request message when the stored uplink data has a low quality.

13. A wireless network access point according to claim 10 wherein the quality indicators include one or more of an error identifier, signal strength identifier or a link error identifier.

14. A wireless access point comprising:
    first means for receiving frames of wireless traffic from a wireless unit;

means for deriving frame-quality information from the wireless traffic and associating each one of the frames with a respective indicator of the frame-quality information;

second means for receiving a request for a particular one or more of the frames;

means for forwarding the particular frames and the respective frame-quality indicators to a distribution unit, the means for forwarding responsive to the second means for receiving; and wherein at least some of the frames are audio frames.

15. A wireless access point according to claim 14 wherein the means for forwarding is operable according to a redundant access point mode.

16. A wireless access point according to claim 14 wherein the means for forwarding is operable according to a server access point mode.

17. A wireless access point according to claim 14 wherein the means for deriving is enabled to evaluate a Cyclic Redundancy Check (CRC) on at least some of the frames.

* * * * *